April 27, 1937.   C. C. JONES   2,078,854
BOUNDARY LAYER AIR CONTROL
Filed June 20, 1936    3 Sheets-Sheet 1

Very Slow Speed

Slow Speed

Cruising Speed

High Speed

Inventor
CLIFFORD C. JONES

By Francis B. Leek
Attorney

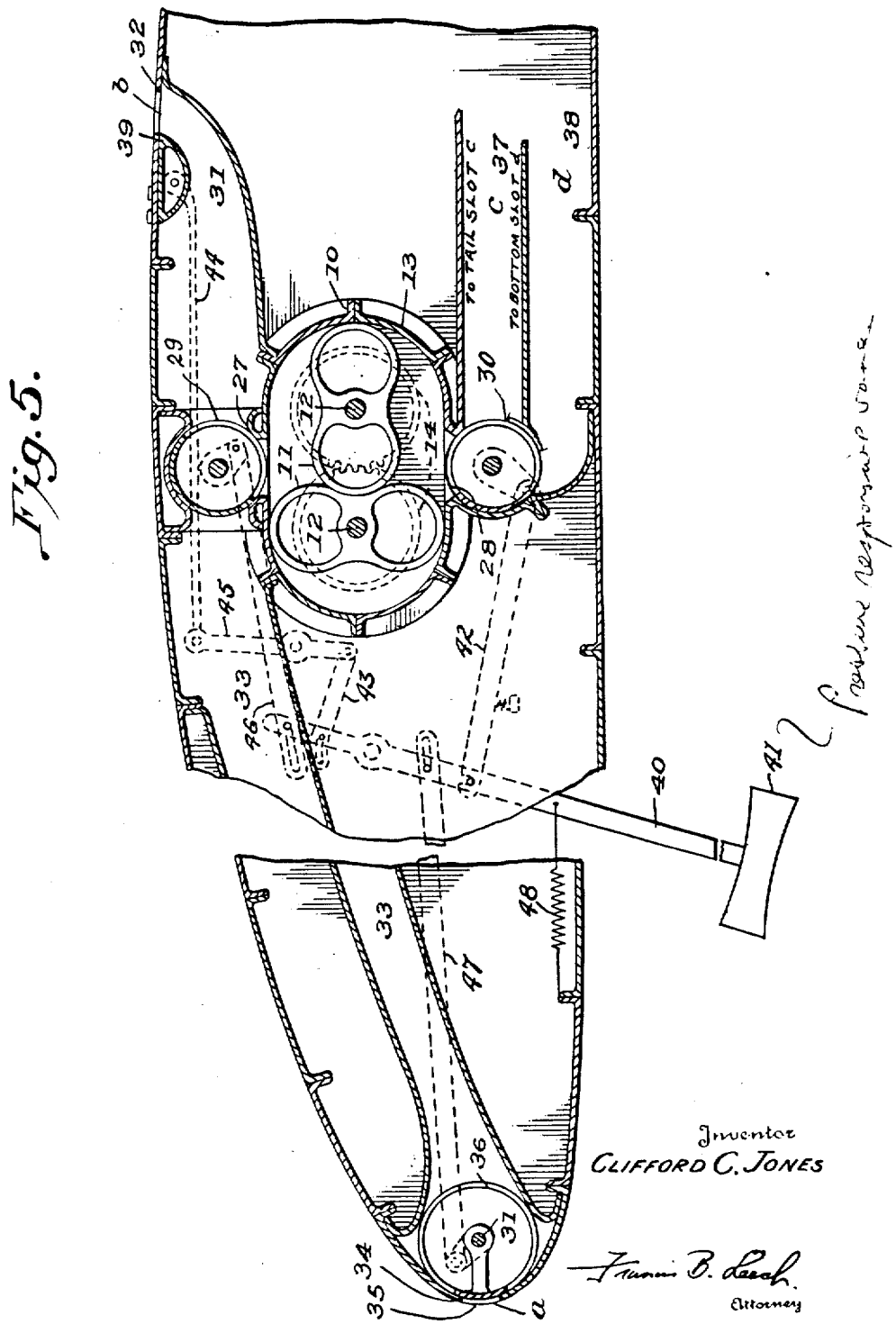

April 27, 1937.   C. C. JONES   2,078,854
BOUNDARY LAYER AIR CONTROL
Filed June 20, 1936   3 Sheets-Sheet 3
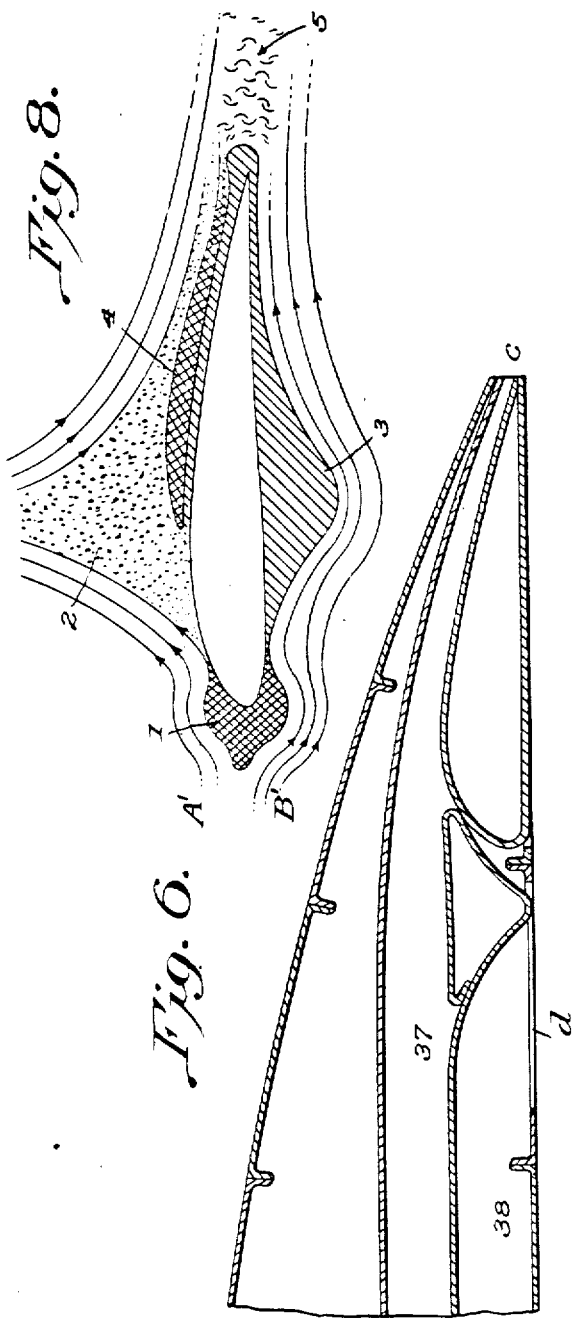
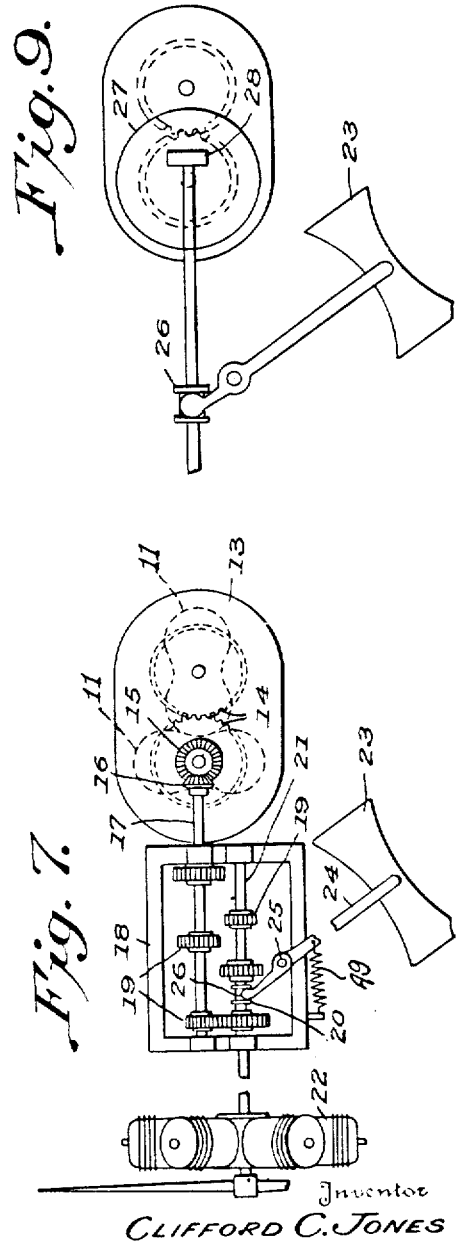
Inventor
CLIFFORD C. JONES
By Francis B. Leesh
Attorney Patented Apr. 27, 1937

2,078,854

BOUNDARY LAYER AIR CONTROL

Clifford C. Jones, Washington, D. C.

Application June 20, 1936, Serial No. 86,425

21 Claims. (Cl. 244—42)

This invention relates to the modification of the absolute coefficients of lift and drag of an aerodynamic section through the control and removal of the boundary layer volume of air from the total surfaces of said sections and the like.

The principal object of this invention relates to a method for controlling boundary layer volume and the intensity flow conditions on the total surfaces of an airfoil or aerodynamic sectional surfaces with definite respect to the boundary layer accumulation volume, the speed of the aerodynamic section and the time element of acceleration. The results of this control show an appreciable improvement of the lift and drag coefficients of the airfoil section and the entire airplane itself.

This novel method and control of the boundary layer volume is directed principally to the prevention, neutralization and balance of the viscous development in the flow of the boundary layer volume. The aerodynamic inefficiency character, so created due to viscosity on the surfaces of airfoils and transverse sections, is overcome, first, by controlling the flow of boundary layer volume or a portion thereof; second, by removing the boundary layer volume or a portion thereof so accumulated; and, third, by accelerating the intensity of the boundary layer volume effects on the total surfaces, both upper and lower, of the airfoil section so treated. It is directed to effect, through the medium of an induction device, improved aerodynamic efficiency and through the regulation of the speed volume and power of the induction force so set up by the induction device toward varying uniformly the magnitude of the lift and drag coefficients. The said induction device includes the utilization of a mechanical system of forced fluid generation, such as a super-charger located within the airfoil, which may exhaust or accelerate the boundary layer either singly or in combination through a spanwise slot arrangement in the surfaces of said airfoil. The boundary layer volume factors so present must be treated and controlled in the most practical agreement and desirable aerodynamic balance to create and otherwise produce improvement in the efficiency of the lift and drag coefficients.

Another object of the invention is the control of the boundary layer volume and its detrimental reaction in, first, the profile drag area; second, the resultant drag area or trailing edge zone; third, the induced lift or sub-atmospheric pressure zone on the top cambered surface of the airfoil or wing; and, fourth, the dynamic lift or super-atmospheric pressure zone on the bottom surface of the airfoil. Wind tunnel tests disclosed dissimilar boundary layer volume characteristics, activity and reaction in each of these zones.

Another object of the invention is the control of the boundary layer volume flow speed and its varying thickness, regardless of air density or temperature change, with relation to the contour of the surfaces of the airfoil section through induction means adapted to force said volume from within the airfoil, said volume flowing in and out of spanwise slots in the surfaces of the airfoil communicating in series. These communicating slots produce an attack directed to simultaneously box and confine the certain boundary layer quantities and their respective activity between slot locations, and so reduce the dragging, tearing, turbulent and transitional effects thus imposed.

Another object of the invention pertains to a speed responsive means actuated by the resistance created by the forward movement of the airfoil section through the fluid medium. This control automatically and synchronously regulates the range of operation and the timed control features of the intake, exhaust and acceleration force creating mechanism which is applied to intake and exhaust slots to produce timed or degreed modification and treatment of the boundary layer volume or mass present on the surfaces of an airfoil at the time of attack. The control is operable and efficient throughout the entire speed range and at all angles of attack of the airfoil section.

Another object of the invention is to provide variable supervision of the time element with respect to the speed of the section and the boundary layer acceleration volume as regards the lift and drag ratio, also the ability to vary the lift and drag coefficients of the section during the course of flight through the induction and mechanical medium of a transmission mechanism in conjunction with the system of speed timing governed by the forward speed of the airplane, the arrangement being similar to the gear shifting mechanisms of present day automobiles.

The adaptation of this method produces an automatic speed responsive control or regulator of the boundary layer volume whereby optimum conditions are created throughout the entire range of speeds from the lowest to the maximum of which the airplane is capable. Likewise, the adaptation of this method produces, in conjunction with the above, actuating means for the opening and closing of valves in rotary blower or pump heads and in the slots, varying the size of the throats of the slots and supervising the variation of the slot areas so as to conform with the necessary measurement values in regard to accepting or exhausting the boundary layer volume. These optimum aerodynamic and mechanical conditions are constant and do not depend on the human element.

A still further object of the invention is to provide a method of control of the boundary layer volume or mass around the circumference of the airfoil so as to produce improved flow or trim, thereby creating force for large drag coefficients now characteristically produced through the use of conventional flaps and aileron control devices. In other words, it is practical to apply force at certain points on an airfoil camber which will slow up or accelerate the boundary layer volume flow, thereby producing a down-wash or an up-wash aerodynamic force coefficient, and in thus so doing the elimination of all movable control units is possible.

Another object of the invention is the substantial and uniform improvement over the range of both the lift and drag coefficients at all angles of attack of the airfoil. For example, if, at zero degree of attack, by the control of the boundary layer volume flow, the $C_L$ shows an increase of 150 per cent to that of the normal airfoil section and the $C_D$ shows a decrease of 30 per cent to that of the normal section through variable mechanical supervision as heretofore disclosed, this improvement or any other optimum setting of treatment will continue to register at all flying speeds and angles of attack of the airfoil from its minimum to its maximum.

Another object of the invention is to vary the rate of boundary layer air removal in relation to the speed of movement of the airfoil and combine the induction and discharge of air at one or more airfoil zones in such manner as to produce the best constant aerodynamic improvement.

Another object of the invention is the employment of a variable speed induction blower or supercharger pump contained in any part of the span of the airfoil, the blower at all times being capable of constantly performing the required exhausting and accelerating of the mass to act uniformly on the complete boundary layer flow volume over the entire airfoil surfaces.

Another object of the invention deals with the modification of any airfoil, airplane fuselage or airplane surface sectional structures and to uniformly increase their aerodynamic values so as to show a consistent percentage gain under all flight conditions.

As is well known by those skilled in the art and as pointed out in my prior U. S. Patents No. 1,764,842, dated June 17, 1930, and Nos. 1,980,139 and 1,980,140, dated November 6, 1934, all airfoils, aerodynamic sectional surfaces, transverse sections and the like, accumulate around their circumferences a stratum of air commonly known as boundary layer. As is pointed out in the above mentioned patents, the applicant has succeeded in definitely increasing the aerodynamic characteristics of an airfoil by the removal of the boundary layer volume or mass from the upper surface thereof and continued research has brought the applicant additional knowledge and information concerning the treatment of the boundary layer volume around the entire airfoil section itself.

To date, the subject of boundary layer has been best expressed as the radical difference between the behavior of an ideal fluid and that of a viscous fluid when flowing around a mass and, while this identifies without a doubt that there exists on the surfaces of a body a volume of air known as boundary layer, it is more of a fictional definition of what boundary layer does rather than what it really is, and all efforts thus far have been toward controlling and removing boundary layer from the upper surface of an airfoil.

It is the contention of the applicant that the boundary layer volume on any mass body such as an airfoil or transverse section having width, breadth and length, is constantly capable of being expressed in cubic valuation originally and can be calibrated and proven to possess through the medium of mass displacement a static air volume and air density gradient. It is this static volume that is the initial boundary layer volume of the mass for, due to the mass possessing a cubic value per unit length, a certain fluid displacement is registered when the mass is associated within the fluid medium and such association causes adherence of the laminar air layers adjacent to the surfaces or the boundaries of the said mass and so sets up a given volume per unit of surface. This phenomenon, while small as regards its increased pressure value registration, remains a static volume at rest, affected only by temperature change as regards its density change until the mass is placed in motion. Heretofore, those computing the subject of boundary layer volume on airfoils have completely overlooked and neglected to consider the importance of determinating and measuring this original static volume. They have considered the phenomenon only as an unestimated, non-dimensional coefficient or friction layer condition existing on the upper surface of an airfoil, after flying speed has been attained, but the results obtained by tests have thus far failed to produce uniform range improvement. Solution and control of the boundary layer volume insofar as creating a practical method and means to utilize an improved attack that would make an airplane fly more efficiently, lies in the recognition, calibration and complete computation of this original factor so created, due to the association of the airfoil as a mass into the fluid medium. It is impossible to measure, control and improve over the entire range of speed and performance of an airfoil, the detrimental inefficiency so set up by the boundary layer volume and its relation to the magnitudes of the lift and drag coefficients unless a workable factor is originally established from which accurate measured and controllable calculations can be defined. If the boundary layer volume interference was a phenomenon that existed on the surfaces of an airfoil only at certain speeds or at a definite range of speed, such an established factor would possibly not be so necessary, but unfortunately, the faster the airfoil travels through the air, the more detrimental is the presence of boundary layer to not only the efficiency of the airfoil but also the airplane performance as a whole.

This static displacement of a mass or airfoil and the volume of the boundary layer that the same creates upon its total surfaces when it is at rest, is constant in volume being only successively replaced each unit of time the chord of the airfoil advances forward.

The applicant has therefore made intensive studies regarding the improvement of airfoils through controlling the boundary layer volume on the upper surface of the same, as evidenced by the before mentioned patents, but recent wind tunnel investigations performed by the applicant disclose the fact that to produce a definite solution that would include appreciable improvement over the entire speed range of the airfoil or airplane, it was just as important to improve conditions in the profile zone, the under surface area or the super-atmospheric pressure zone producing the dynamic lift, together with the trailing edge zone occupied by the resultant drag of the airfoil because a systematic and continuous attack could be devised that would uniformly improve the lift and drag coefficients of any airfoil section by treating a complete circulating volume.

In fact, many of the unknown qualities of boundary layer characteristics have heretofore been concealed due to the lack of investigation in the above mentioned three new zones. A startling discovery was made by the applicant in the super-atmospheric pressure zone which creates, in its course of producing the dynamic lift of the airfoil section at certain angles of attack, a zone of intense air pressure distribution but of small airflow speed between the 30 per cent ordinate of its chord section and the 65 per cent ordinate. Investigation disclosed that a major portion of the successive boundary layer volumes being displaced by the airfoil upon approaching the profile of the airfoil, after sufficient lift force had been established capable of sustaining the weight of the airfoil, refused to be mixed and diverted upward by the impact force so created upon striking the profile but were attracted into the super-atmospheric pressure zone and subjected to early high rotational effects on the under camber of the airfoil. Such a zone of flow interference, upon being partially absorbed by the slot in the under surface of the airfoil, to produce velocity relieves this condition and improves the lift, including the combined lift coefficients, induced and dynamic, as well as the profile and resultant drag coefficients of the section. Further wind tunnel tests revealed improvement through the leading profile slot which, like the super-atmospheric pressure region, absorbed a certain percentage of the impact velocity condition, which no doubt intensifies the importance of the boundary layer volume phenomenon as it passes over the entire airfoil surfaces both above and below. Further investigation disclosed the desired combination slot effects and timing which prove conclusively that the problem must be solved with regards to both the lift and drag coefficients, in combination and synchronously.

Proof of this static volume was established and estimated in a recent wind tunnel test by the applicant with the result that a test section of an airfoil was calibrated first on paper as regards the boundary layer volume from zero speed to maximum speed and then in association with a calibrated induction blower. The volume for volume calibration of both the boundary layer volume and the blower volume checked precisely, and an improvement in the absolute lift and drag coefficients was obtained in exact percentages at both minimum and maximum angles of attack and tested speeds.

The objectives of this invention may be successfully carried out by designing an aerodynamic section and airfoil in accordance with the structure disclosed in the drawings wherein—

Figures 5 and 6 illustrate a vertical transverse cross section of an airplane wing constructed in accordance with the present invention.

Figure 7 shows a diagrammatic view, partly broken away and partly in section, of a power transmitting mechanism.

Figure 8 is a diagrammatic view of the various lift and drag portions which surround the airfoil in flight and illustrates the boundary layer masses affecting the airfoil while passing through a fluid medium.

Figure 9 is a fragmentary view of a modified power transmission mechanism.

Referring to Figure 8, it will be observed that the upper and lower laminar air layers passing on either side of the airfoil are designated by the letters A' and B'. Numeral 1 denotes the profile impact sector and portrays diagrammatically the profile drag zone and its contour and disposition prior to its flow backward over the airfoil.

Sector 2 indicates the induced lift or sub-atmospheric zone which is generated above the center of pressure portion of the airfoil section.

Numeral 3 denotes the dynamic lift or super-atmospheric zone which forms below the under surface of the airfoil.

Numeral 4 designates the transverse backwash into the induced or resultant drag field 5 and consists of a low pressure area that has been found to be most detrimental to the efficient performance of the airfoil.

As heretofore stated, the invention broadly consists of mechanically controlling and removing the laminar air layers or boundary layer volume from the sustaining surfaces of an airfoil. This is accomplished by providing a plurality of intake and exhaust ports at definitely located portions of the airfoil whereby the boundary layer volume may be selectively removed from certain of these portions, supercharged or compressed and accelerated through the medium of an impeller or blower, and discharged through certain other of the ports to additionally remove a further accumulation of boundary layer mass.

Referring to the diagrammatic Figures 1 to 4 inclusive, the arrows indicate the intake and exhaust of the boundary layer volume at the several speeds indicated.

Figure 2:
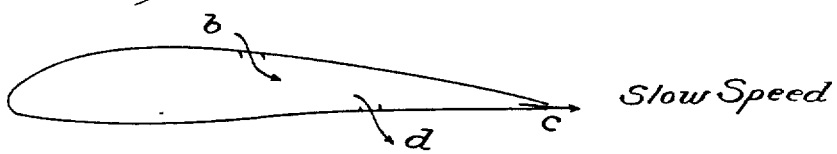

For purposes of illustration, the diagrammatic showing of the air flow in Figure 8, together with the setting of the airfoil ports and fluid passages in Figure 5 all portray the invention while the airfoil is travelling at slow speed as shown in Figure 2. Figure 7 shows the blower drive for its maximum speed corresponding to valve settings at high speed in Figure 4.

As disclosed in Figures 5 and 6, there is mounted interiorly of the airfoil a coacting vane pump or blower 10 and impellers 11 mounted on parallel horizontal shafts 12 secured in the ends of casing 13 which serves as a main spar. The impellers are geared together through gears 14 and receive power through end pinion 15 driven by beveled gear 16 secured to shaft 17 which terminates in a selective change speed transmission 18. This change speed device may be of conventional automobile design wherein parallel shafts on which are mounted a series of various ratio gears 19 adapted to be engaged with one another through sliding collar 20. The driven shaft 21 secures its power through suitable power takeoff means connected to the engine 22. As will be explained hereinafter, the change speed and at points adjacent the normal atmospheric pressure zone and the subatmospheric pressure zone, compressing said boundary layer volume of air and discharging said volume at points adjacent the superatmospheric pressure zone and the resultant pressure zone of the said aerodynamic section.

7. The method of modifying the absolute coefficients of lift and drag of an aerodynamic section while in motion, said section possessing in the vicinity of its leading edge a normal atmospheric pressure zone, above its upper cambered surface a subatmospheric pressure zone, below its lower cambered surface a superatmospheric pressure zone at a higher pressure than the subatmospheric pressure zone and adjacent its trailing edge a resultant atmospheric pressure zone created by the convergence of the airflows passing from the section and of a higher pressure than the normal pressure zone, the steps of removing the boundary layer volume of air substantially over the entire span of said section from and at a point adjacent the normal atmospheric pressure zone, compressing said boundary layer volume of air and discharging said volume at a point adjacent the resultant atmospheric pressure zone in rear of trailing edge of the said aerodynamical section.

8. The method of modifying the absolute coefficients of lift and drag of an aerodynamic section while in motion, said section possessing in the vicinity of its leading edge a normal atmospheric pressure zone, above its upper cambered surface a subatmospheric pressure zone, below its lower cambered surface a superatmospheric pressure zone at a higher pressure than the subatmospheric pressure zone and adjacent its trailing edge a resultant atmospheric pressure zone created by the convergence of the airflows passing from the section and of a higher pressure than the normal pressure zone, the steps of removing the boundary layer volume of air substantially over the entire span of said section from and at a point adjacent a higher pressure zone, compressing said removed boundary layer volume and discharging said compressed boundary layer volume at a point adjacent the subatmospheric pressure zone, thereby utilizing said compressed and discharged boundary layer volume of air to remove boundary layer volume of air from the lower pressure zone.

9. The method of improving the lift and drag coefficients of an aerodynamic section while in motion which comprises selectively removing portions of boundary layer air volume from adjacent either the upper airfoil surface or the leading edge thereof, increasing the density of the removed portion, and discharging said portion into the zone adjacent the trailing edge of said airfoil.

10. In an aircraft provided with an airfoil section, a blower, means for inducing a portion of the boundary layer air volume from a point adjacent an exterior surface of said section and feeding said portion to the blower, means for discharging said portion at increased pressure at a remote point adjacent the exterior surface of said section, means for driving the blower and means responsive to increase in speed of the aircraft for increasing the speed of the blower and the rate of discharge of the boundary layer air volume.

11. In an aircraft in combination with an airfoil and a device as set forth in claim 10, means forming a spanwise slot adjacent the leading edge of the airfoil section for the intake of air and means forming another spanwise slot adjacent the trailing edge of the airfoil section for the discharge of air.

12. In an aircraft in combination with an airfoil and a device as set forth in claim 10, means forming a spanwise slot adjacent the upper surface of the airfoil section for the intake of air and means forming another spanwise slot adjacent the trailing edge of the airfoil section for the discharge of air.

13. In an aircraft in combination with an airfoil and a device as set forth in claim 10, means forming a spanwise slot adjacent the upper surface of the airfoil section for the intake of air and means forming another spanwise slot in the lower surface of the airfoil section for the discharge of air.

14. In an aircraft in combination with an airfoil and a device as set forth in claim 10, means forming a spanwise slot adjacent the upper surface of the airfoil section for the intake of air, means forming another spanwise slot in the lower surface of the airfoil section, and means forming another slot adjacent the trailing edge of the airfoil section for the discharge of air.

15. In an aircraft provided with an airfoil section, a device as set forth in claim 10, a motor, selective gear transmission means connecting the motor to the blower, and means responsive to changes in air speed for controlling said transmission means for varying the volumetric intake and discharge of the boundary layer air volume.

16. In an aircraft provided with an airfoil section, a blower, transverse slots located substantially over the entire span of said section at separated points in the surface of said section, a conduit connecting each slot to said blower, a valve in each conduit and means for simultaneously operating said valves, said conduits and blower being arranged to draw in boundary air through one slot and discharge said air through a remote slot.

17. In an aircraft, a device as set forth in claim 16 wherein the means for operating the valves comprises a vane operably responsive to variations in aircraft speed, a lever for supporting the vane and means for operably connecting the lever to each valve.

18. In an aircraft, an airfoil section, means forming a slot adjacent the leading edge and extending along substantially the entire span of the said airfoil section for the intake of the boundary layer air, means forming another slot adjacent the trailing edge and extending along substantially the entire span of the airfoil section for discharge of the boundary layer air, and a blower connected to each of the slots and substantially coextensive in span therewith, to uniformly induce air through the forward slot and discharge air through the rearward slot.

19. In an aircraft having an airfoil section, air inlet ports in the leading tip and upper airfoil surface respectively, air outlet ports in the trailing edge and lower airfoil surface respectively, a blower, and means for selectively inducing the boundary layer air volume through either of said first named ports and discharging said air selectively either entirely from the trailing edge port, or a portion thereof from said trailing edge port and another portion through the lower surface port.

20. In an aircraft provided with an airfoil section, a blower, said section being provided with transverse slots in the upper and lower surfaces thereof and in the leading and trailing edges by valve 36 and that slots $b$, $c$, $d$ are open to provide air flow as illustrated in Fig. 2 wherein air flow is indicated by arrows to show induction of air at $b$ and ejection of air at $c$ and $d$.

Figure 3:
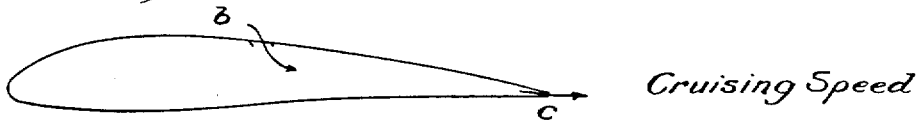

Upon increase of aircraft speed to provide cruising speed, air pressure upon the vane 41 will move lever 40 rearwardly thereby moving link rod 42 and valve 30 to close the inlet to air conduit 38 and outlet $d$ in a manner to permit all boundary air induced inwardly at $b$, as shown in Fig. 3, to be ejected under great pressure and velocity outwardly from the trailing slot $c$.

Upon further increase of aircraft speed to provide a very high speed, increased air pressure on the vane 41 will move lever 40 to its extreme rearmost position whereupon the upper end of the lever 40 will move links 43, 44, lever 45, and slide valve 39 to close inlet $b$. At the same time, links 46 and 47 will be moved to respectively move valves 29 and 36. Rotation of valve 29 clockwise will uncover the outlet of conduit 30 and permit induction of air therefrom into blower casing 13, valve 36 having been rotated clockwise to open the wing tip slot $a$. It will be seen, therefore, that all boundary layer air induced from the leading tip zone will flow rearwardly through conduit 33, blower casing 13 and, therefrom, through conduit 37 to be discharged at high velocity and pressure outwardly from the trailing slot $c$ into the trailing tip zone to thereby disperse the boundary layer in and adjacent that zone shown by the arrows in Fig. 4.

A preferred form of the invention has been shown in the accompanying drawings, although certain of the various elements have been shown in a conventional form. It is to be understood, however, that desirable variations and equivalents are contemplated within the scope permitted by the claims which follow.

I claim:

1. The method of modifying the absolute coefficients of the lift and drag of an aerodynamic section while in motion, said section possessing in the vicinity of its leading edge a normal atmospheric pressure zone, above its upper cambered surface a subatmospheric pressure zone, below its lower cambered surface a superatmospheric pressure zone at a higher pressure than the subatmospheric pressure zone and adjacent its trailing edge a resultant atmospheric pressure zone created by the convergence of the airflows passing from the section and of a higher pressure than the normal pressure zone, the steps of removing the boundary layer volume substantially over the entire span of said section, from and at a point adjacent a lower pressure zone, compressing said removed boundary layer volume within said section, and discharging said compressed boundary layer volume at a point adjacent a higher pressure zone, thereby utilizing said compressed and discharged boundary layer volume to remove boundary layer volume from the higher pressure zone.

2. The method of modifying the absolute coefficients of the lift and the drag of an aerodynamic section while in motion, said aerodynamic section possessing in the vicinity of its leading edge a normal atmospheric pressure zone, a subatmospheric pressure zone above its upper cambered surface, a superatmospheric pressure zone below its lower cambered surface at a higher pressure than the subatmospheric pressure zone, and a resultant pressure zone adjacent its trailing edge of higher pressure than the normal pressure zone created by the convergence of the airflow from the subatmospheric and superatmospheric pressure zones, the steps of removing the boundary layer volume substantially over the entire span of said section from and at a point adjacent the subatmospheric pressure zone, compressing said volume and discharging said compressed boundary layer volume at a point adjacent said superatmospheric pressure zone whereby to disperse boundary layer volume in said superatmospheric pressure zone.

3. In the method set forth in claim 1, the additional step of uniformly varying the rate of removal and discharge of the boundary layer volume in proportion to the speed of the aerodynamic section.

4. The method of modifying the absolute coefficients of lift and drag of an aerodynamic section while in motion, said section possessing in the vicinity of its leading edge a normal atmospheric pressure zone, above its upper cambered surface a sub-atmospheric pressure zone, below its lower cambered surface a super-atmospheric pressure zone at a higher pressure than the subatmospheric pressure zone and adjacent its trailing edge a resultant atmospheric pressure zone created by the convergence of the airflows passing from the section and of a higher pressure than the normal pressure zone, the steps of removing the boundary layer volume of air substantially over the entire span of the said section from and at points adjacent the subatmospheric pressure zone and the normal atmospheric pressure zone, compressing said boundary layer volume of air and discharging said volume at a point adjacent the superatmospheric pressure zone.

5. The method of modifying the absolute coefficients of lift and drag of an aerodynamic section while in motion, said section possessing in the vicinity of its leading edge a normal atmospheric pressure zone, above its upper cambered surface a subatmospheric pressure zone, below its lower cambered surface a superatmospheric pressure zone at a higher pressure than the subatmospheric pressure zone and adjacent its trailing edge a resultant atmospheric pressure zone created by the convergence of the airflows passing from the section and of a higher pressure than the normal pressure zone, the steps of removing the boundary layer volume of air substantially over the entire span of the said section from and at a point adjacent the subatmosphere pressure zone, compressing said boundary layer volume of air and discharging said volume, one part thereof at a point adjacent the superatmospheric pressure zone and another part thereof at a point adjacent the resultant pressure zone in rear of trailing edge of said aerodynamic section.

6. The method of modifying the absolute coefficients of lift and drag of an aerodynamic section while in motion, said section possessing in the vicinity of its leading edge a normal atmospheric pressure zone, above its upper cambered surface a subatmospheric pressure zone, below its lower cambered surface a superatmospheric pressure zone at a higher pressure than the subatmospheric pressure zone and adjacent its trailing edge a resultant atmospheric pressure zone created by the convergence of the airflows passing from the section and of a higher pressure than the normal pressure zone, the steps of simultaneously removing the boundary layer volume of air substantially over the entire span of said airfoil section from mechanism is automatically controlled by a speed or pressure responsive venturi or vane 23 carried on arm 24 which is pivoted at 25 and terminates in a fork 26 in engagement with sliding collar 20. Those skilled in the art will readily appreciate that the vane 23 being oscillated by the forward speed or wind pressure of the plane, will automatically shift the gears 19 to vary the speed of the blower so as to drive the pump at the proper speed regardless of the speed of the engine.

Figure 9 illustrates a modified change speed mechanism for operating the pump impellers in which there is substituted a friction disc 27 driven by friction roller 28. When the collar 26 is shifted by movement of the vane 23, the roller 28 will be shifted toward or away from the center of the friction disc so that a progressive change of speed inures.

The pump or blower casing 13 is provided with top and bottom inlets 27 and 28 controlled by rotary cylindrical valves 29 and 30, respectively. The top valve 27 communicates not only with the inlet port 27 but also with conduit 31 terminating in a longitudinal transverse slot 32 formed in the upper span of the airfoil. The valve 29, upon partial rotation, seals off the passage 31 and opens pump casing to forwardly extending passage 33 which extends to the leading edge 34. An opening 35 is provided in the profile or leading edge portion of the airfoil and is opened or closed from communication with passage 33 by rotatable cylindrical valve 36.

The bottom opening 28 of the pump casing is controlled by rotatable cylindrical valve 30 to selectively register with passages 37 and 38, while the port or slot 32 is opened and closed by means of sliding valve 39.

The series of valves, 29, 30, 36 and 39, are all operated in proper sequence and synchronism through the pivoted links 42, 43, 44, 45, 46 and 47, shown in dotted lines in Figure 5. The operating arms of the linkage mechanism terminate and receive movement through loose motion connections from pivoted operating lever 40 which depends below the lower surface of the airfoil and terminates in a speed of pressure responsive vane 41. For convenience, the profile passage 33 is indicated by letter *a* and the top port or slot 35 by letter *b*, while the lower passages 37 and 38 are indicated by letters *c* and *d*, respectively.

It will be therefore obvious that, when movement is imparted to operating lever 40, it will rotate the valves to open and close the several intake and exhaust ports. For illustrative purposes, the valves as shown in Figure 5 indicate the position at which they are set when the airfoil is travelling at slow speed, as further illustrated in Figure 2.

As before stated, the induction pump or blower 13 is positively driven through the power take-off mechanism attached to the prime mover 22 and the speed at which the pump is operated is proportional to the forward speed of the airplane. Thus, as the speed of the prime mover 22 which rotates the propeller of the airplane is increased, the forward speed of the airplane is increased and, consequently, the air pressure through which the airplane is passing increases. This accelerated speed or pressure operates the vane 23 to shift the change speed mechanism 18 and drive the pump or blower in direct ratio to the increased speed. Tension springs 49 and 48 function, respectively, to restore vanes 23 and 41 to their slow speed positions. The formation of boundary layer volume or mass also increases proportionately to the forward speed of the airplane and it is, therefore, essential that a greater proportion of the boundary layer volume or mass be removed from the airfoil as the miles per hour speed increases.

On the basis of extensive wind tunnel tests, it has been conclusively proven that the formation and control of boundary layer volume may be efficiently and expeditiously removed and controlled by synchronizing the intake and exhaust thereof, as diagrammatically shown in Figures 1 to 4 inclusive.

Figure 1:
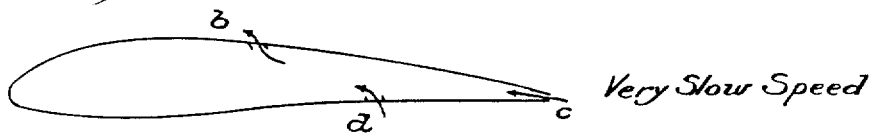
Figures 1, 2, 3 and 4 illustrate diagrammatic transverse airfoil sections indicating the flow of boundary layer at several speeds.

Figure 1 is diagrammatic of the removal of the boundary layer volume at very slow speeds and under such conditions the laminar layers are induced from the trailing edge passages *c* and super-atmospheric pressure section *d* and exhausted through the top slot *b* which is located in the sub-atmospheric pressure action.

Figure 2 is diagrammatic of the removal of the boundary layer volume at slow speeds wherein the boundary layer volume is removed from the sub-atmospheric pressure zone *b*, accelerated in speed and pressure through the medium of the pump or blower, and discharged into the trailing edge zone *c* and the super-atmospheric pressure zone *d*. In Figures 1 and 2, the air flows shown by the arrows are obtained by a similar setting of valves but the direction of rotation of the blower is reversed in Figure 1 from the direction used in Figure 2.

Figure 3 is diagrammatic of the flow of boundary layer at cruising speeds wherein the boundary layer volume is sucked away from the sub-atmospheric pressure section *b*, accelerated, and discharged into the trailing edge zone *c*.

Figure 4:

Figure 4 is diagrammatic of the removal of boundary layer volume at high speeds. When an airfoil or other aerodynamic section is passing through a fluid medium at high speeds, a tremendous profile pressure is created which builds up in a formation similar to the cross-hatched silhouette indicated by numeral 1 in Figure 8. Under such conditions, the boundary layer is induced from the leading edge portion *a* at a speed greater than the normal air speed of the airfoil and, after the mass has been increased in pressure and flow speed, it is discharged into the trailing edge zone *c*.

Under all of the conditions just explained, the rate of fluid flow of the induced boundary layer volume or mass is accelerated with regard to the pressure and speed of the mass to insure increased internal pressure and velocity at the moment of its discharge.

This is primary for the reason that in every instance the discharge not only dissipates the boundary layer volume which has been removed but the accelerated flow of the mass is discharged adjacent another sector of the airfoil to further remove boundary layer mass from adjacent that sector.

In operation, as hereinbefore explained, Fig. 5 shows the relative positions of valves 29, 30, 36 and 39 during slow speed of the airplane wherein the boundary layer mass is induced from above the airfoil through slot *b*, accelerated and compressed by blower 10 which is operating at its relatively low speed, and forced at high velocity and pressure from tail slot *c* and bottom slot *d* to remove the boundary air mass from the trailing edge zone and from the lower super-atmospheric pressure zone.

It will be noted that the leading slot *a* is closed thereof, a conduit connecting each slot to the blower, a valve associated with each conduit and related slot, a main control lever, links connecting said lever to respective valves, and means operably responsive to increase of speed of said section for moving said lever and valves.

21. In an aircraft provided with an airfoil section, a blower, said section being provided with transverse slots in the upper and lower surfaces thereof and in the leading and trailing edges thereof, a conduit connecting each slot to the blower, a valve associated with each conduit and related slot, a main control lever, links connecting said lever to respective valves, said links being movable by shift of said lever to its forward position to close the leading edge valve and open the other valves, movement of said lever to its rearward position adapted to move the links to close the valves associated with the upper and lower surfaces and open the valves associated with the leading and trailing edges.

CLIFFORD C. JONES.

Patent No. 2,078,854        Granted April 27, 1937

CLIFFORD C. JONES

The above entitled patent was extended October 2, 1951, under the provisions of the Act of June 30, 1950, for 6 years and 90 days from the expiration of the original term thereof.

*Commissioner of Patents.* thereof, a conduit connecting each slot to the blower, a valve associated with each conduit and related slot, a main control lever, links connecting said lever to respective valves, and means operably responsive to increase of speed of said section for moving said lever and valves.

21. In an aircraft provided with an airfoil section, a blower, said section being provided with transverse slots in the upper and lower surfaces thereof and in the leading and trailing edges thereof, a conduit connecting each slot to the blower, a valve associated with each conduit and related slot, a main control lever, links connecting said lever to respective valves, said links being movable by shift of said lever to its forward position to close the leading edge valve and open the other valves, movement of said lever to its rearward position adapted to move the links to close the valves associated with the upper and lower surfaces and open the valves associated with the leading and trailing edges.

CLIFFORD C. JONES.

Patent No. 2,078,854            Granted April 27, 1937

CLIFFORD C. JONES

The above entitled patent was extended October 2, 1951, under the provisions of the Act of June 30, 1950, for 6 years and 90 days from the expiration of the original term thereof.

*Commissioner of Patents.*

Patent No. 2,078,854                          Granted April 27, 1937

CLIFFORD C. JONES

The above entitled patent was extended October 2, 1951, under the provisions of the Act of June 30, 1950, for 6 years and 90 days from the expiration of the original term thereof.

*Commissioner of Patents.*